(12) United States Patent
Houlihan

(10) Patent No.: US 9,079,600 B2
(45) Date of Patent: Jul. 14, 2015

(54) MEDI-SPA SERVICE CART

(76) Inventor: Nancy A. Houlihan, Brookline, MA (US)

(*) Notice: Subject to any disclaimer, the term of this patent is extended or adjusted under 35 U.S.C. 154(b) by 543 days.

(21) Appl. No.: 13/385,453

(22) Filed: Feb. 21, 2012

(65) Prior Publication Data

US 2012/0217710 A1    Aug. 30, 2012

Related U.S. Application Data

(60) Provisional application No. 61/463,981, filed on Feb. 25, 2011.

(51) Int. Cl.
| | | |
|---|---|---|
| *B62B 3/02* | (2006.01) | |
| *B62B 3/10* | (2006.01) | |
| *B62B 3/00* | (2006.01) | |
| *A47B 31/00* | (2006.01) | |

(52) U.S. Cl.
CPC . *B62B 3/10* (2013.01); *B62B 3/008* (2013.01); *B62B 3/02* (2013.01); *A47B 31/00* (2013.01); *B62B 2202/023* (2013.01); *B62B 2202/67* (2013.01); *B62B 2206/003* (2013.01); *B62B 2206/06* (2013.01); *B62B 2501/02* (2013.01)

(58) Field of Classification Search
USPC .............. 280/47.34, 47.35, 79.11, 79.2, 79.3
See application file for complete search history.

(56) References Cited

U.S. PATENT DOCUMENTS

| | | | |
|---|---|---|---|
| 944,560 A | 12/1909 | Joseph | |
| 1,409,609 A | 3/1922 | Stockle | |
| 1,599,911 A * | 9/1926 | Morehart | 280/35 |
| 1,653,657 A | 12/1927 | Pretsch | |
| 1,898,867 A * | 2/1933 | Brown | 312/280 |
| 2,805,905 A | 9/1957 | Levitan et al. | |
| 2,819,938 A * | 1/1958 | Zerver | 312/201 |
| 2,903,273 A * | 9/1959 | Hennion | 280/33.991 |
| 3,339,938 A * | 9/1967 | Edmisson | 280/79.3 |
| 4,715,573 A * | 12/1987 | Liegel | 248/129 |
| 4,756,496 A * | 7/1988 | Hosan et al. | 248/161 |
| D302,618 S | 8/1989 | Gottselig | |
| 5,397,875 A | 3/1995 | Bechtold, Jr. | |
| 5,460,391 A * | 10/1995 | Gantz et al. | 280/30 |
| 5,791,534 A * | 8/1998 | Davis et al. | 224/148.7 |
| 6,116,690 A * | 9/2000 | Larson | 297/344.19 |
| 6,182,583 B1 * | 2/2001 | Larson | 108/147 |
| 6,224,072 B1 * | 5/2001 | Weck et al. | 280/47.35 |
| 7,090,072 B1 * | 8/2006 | Elliott | 206/15.3 |
| 7,490,837 B2 * | 2/2009 | Pond et al. | 280/47.35 |
| D588,272 S | 3/2009 | Meiser | |
| 8,197,428 B2 * | 6/2012 | Helgeson et al. | 601/152 |
| 2001/0015535 A1 * | 8/2001 | Weck et al. | 280/47.315 |
| 2002/0044059 A1 * | 4/2002 | Reeder et al. | 340/573.1 |
| 2004/0135045 A1 * | 7/2004 | Larson | 248/188.1 |

* cited by examiner

*Primary Examiner* — J. Allen Shriver, II
*Assistant Examiner* — Bridget Avery
(74) *Attorney, Agent, or Firm* — Greenblum & Bernstein, P.L.C.

(57) ABSTRACT

Disclosed herein is a medi-spa service cart having improved storage, convenience and portability properties. The cart includes a castered base, a selectively extensible tubular vertical support and, affixed to the upper end of the support, a principal service tray.

3 Claims, 3 Drawing Sheets

MEDI-SPA SERVICE CART

CROSS-REFERENCE TO RELATED APPLICATION

This application claims the benefit of U.S. Provisional Application Ser. No. 61/463,981, filed by the present applicant on Feb. 25, 2011.

BACKGROUND OF THE INVENTION

The present invention relates broadly to service carts and is more particularly concerned with a medi-spa service cart construction specifically adapted for use in massage therapy. While the service cart described in detail hereinafter is specifically directed to the delivery of massage therapy, it will be obvious to those of skill in the art that it may also be used to good and beneficial effect in the delivery of other therapies or treatments to the human or animal body, such as physical therapy, manual therapy, bodywork and the like.

In the performance of therapeutic massage the subject conventionally sits on a chair or lies on a table and the therapist stands or sits proximate the subject and obtains the necessaries for the massage, such as lotions, gels, creams, cleansing agents, towels, napkins, various implements and the like from a conveniently stationed service cart. The conventional service carts of the prior art are generally in the nature of wheeled cabinets, stacked shelves, drawers, or combinations of these which are bulky and often present difficulties in movement over the floor surface, convenient storage after the massage session ends and, further, lack portability for offsite visits. In accordance with the present invention, however, many of these problems have been resolved or at least greatly ameliorated.

OBJECTS OF THE INVENTION

It is a principal object of the invention to provide a new and novel medi-spa service cart.

It is another object of the invention to provide a medi-spa service cart of substantially lesser bulk, easier mobility, greater adjustability for proper body mechanics, greater portability for office/offsite visits and more facile storability than those of the prior art.

It is yet another object of the invention to provide a medi-spa service cart having the foregoing benefits and advantages and which is especially adapted for massage therapy service.

Other objects and advantages of the invention will, in part, be obvious and will, in part, appear hereinafter.

SUMMARY OF THE INVENTION

In accordance with the invention the medi-spa cart broadly comprises a castered base, a selectively extensible vertical support member comprising at least two telescoping tubular elements extending upwardly from said base and, mounted to the uppermost end of said support member, a principal service tray. In one preferred embodiment of the invention the cart construction comprises means whereby the overall cart length may be temporarily manually shortened by a few inches. In another preferred embodiment, the principal service tray element of the construction is provided with at least one and, most preferably, a plurality, of recesses each being of a size and shape to closely receive and retain the containers for the goods used in service.

DESCRIPTION OF THE SEVERAL VIEWS OF THE DRAWING

A fuller understanding of the present invention may be had by referring to the following description and drawings wherein, in the drawings.

DETAILED DESCRIPTION OF THE INVENTION

Figure 1:
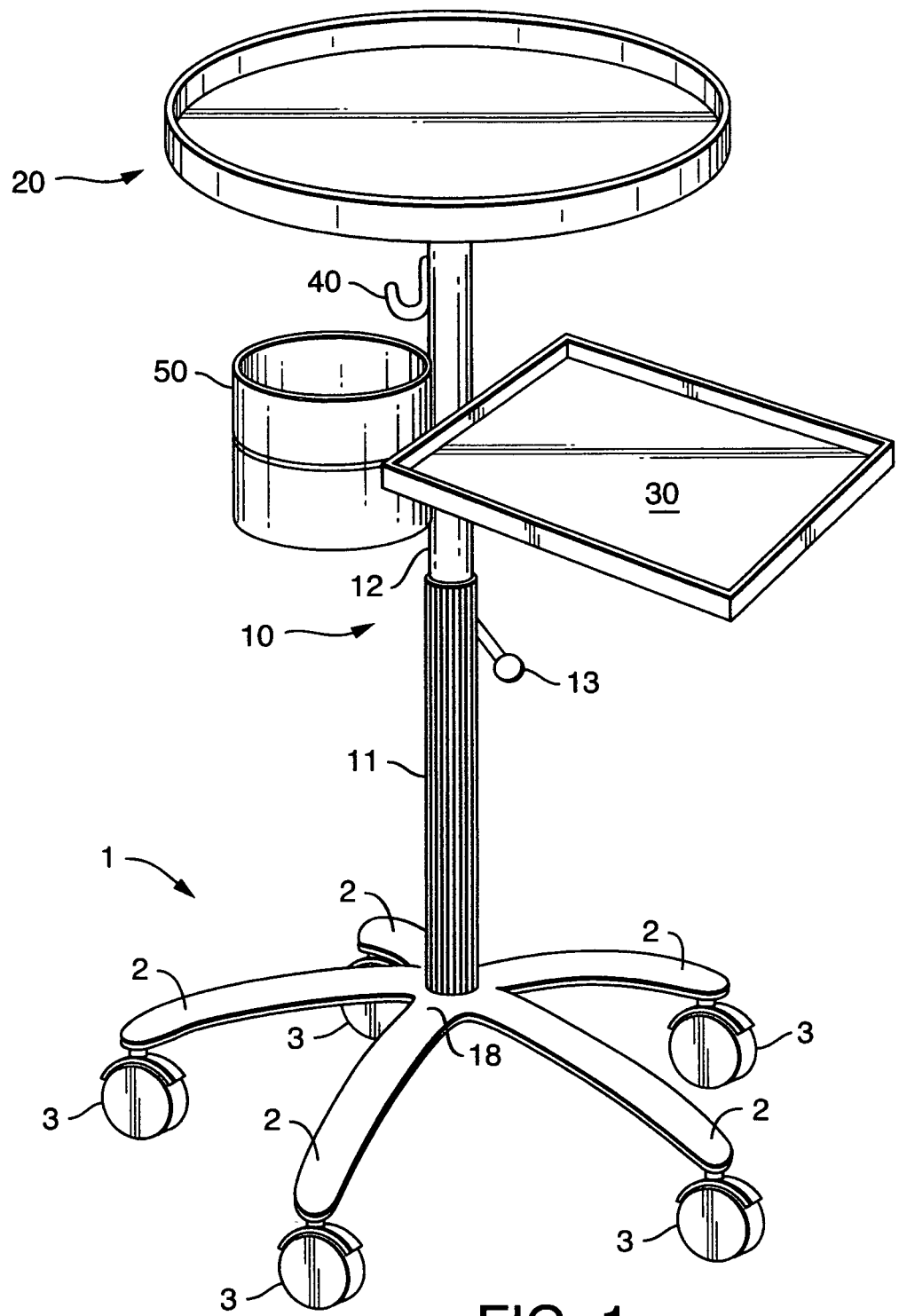
FIG. 1 is a schematic isometric view of one embodiment of the medi-spa service cart of the invention.

Referring now to FIG. 1, the service cart of the invention broadly comprises castered base 1, selectively extensible vertical support member 10 comprising at least two telescoping tubular elements and, affixed to the upper end of the uppermost tubular element of said support member 10, a principal service tray 20.

Castered base 1 preferably comprises a central hub 18 and a plurality of at least three and, of even greater preference, five, radially and equiangularly spaced legs 2 extending therefrom. Depending from and pivotally affixed to the outer end of each of said legs 2 is a caster wheel or roller 3. The resulting array of caster wheels or rollers 3 serves, of course, to facilitate movement of the cart over a floor support surface. Desirably, one or more of the wheels or rollers 3 is provided with a releasable brake whereby the cart is enabled to be held in a fixed location.

Affixed to the central hub 18 of the base 1 is a selectively extensible vertical support member 10. Said support member 10 comprises at least two telescoping tubular elements and can, for example, take the form of a telescoping tubular structure comprising a lowermost tube element 11 and, slidably nesting thereover, an uppermost tube element 12. Latch means 13 serves to controllably lock the uppermost tube element 12 to the lowermost tube element 11 at a selected length of extension of the support member 10. The particular construction of the latch means 13 is generally non-critical and many suitable constructions thereof will be obvious to those of skill in the art. For instance, latch means 13 can be in the nature of a simple thumb screw threaded through the uppermost tube element 12 and which locks the support member 10 at its pre-selected length by bearing on the surface of the lowermost tube element 11. Also suitable are various known spring latches which cooperate with a linear array of notches, teeth or cogs on the lowermost tube element 11 and which, without manipulation thereof, permit extension of the support member 10 and automatic latching of the tube elements 11 and 12 together at the selected length of extension, but which does require manipulation to permit retraction of said support member. Thus, in use, the operator first releases latch means 13, then extends the support member 10 to the desired length and, finally, re-engages the latch 13 so as to secure the cart construction at its preselected overall length.

The dimensioning of the tubular support member 10 is subject to considerable variation and will, in general, be obvious to those of skill in the art. A principal consideration in the selection of said dimensioning will, of course, reside in the specific purpose for which the cart is to be employed. As previously mentioned, a massage therapist works from both sitting and standing positions. Thus, for this service, I have found that a support member 10 which is dimensioned to as to provides an overall cart length range of from about 18 inches to about 42 inches to be suitable.

Affixed to the upper end of the uppermost tube element 12 is a principal service tray 20 which, desirably, is of circular geometry. It is further preferred that the principal service tray 20 be affixed to the upper end of the uppermost tube element 12 in a detachable manner, thereby to enable facile removal and such cleansing of the tray as may be required. This can be accomplished, for example, by providing the bottom of the tray with a collar dimensioned so as to define a snugly fitting socket to receive the upper end of the uppermost tube element 12.

Figure 4:
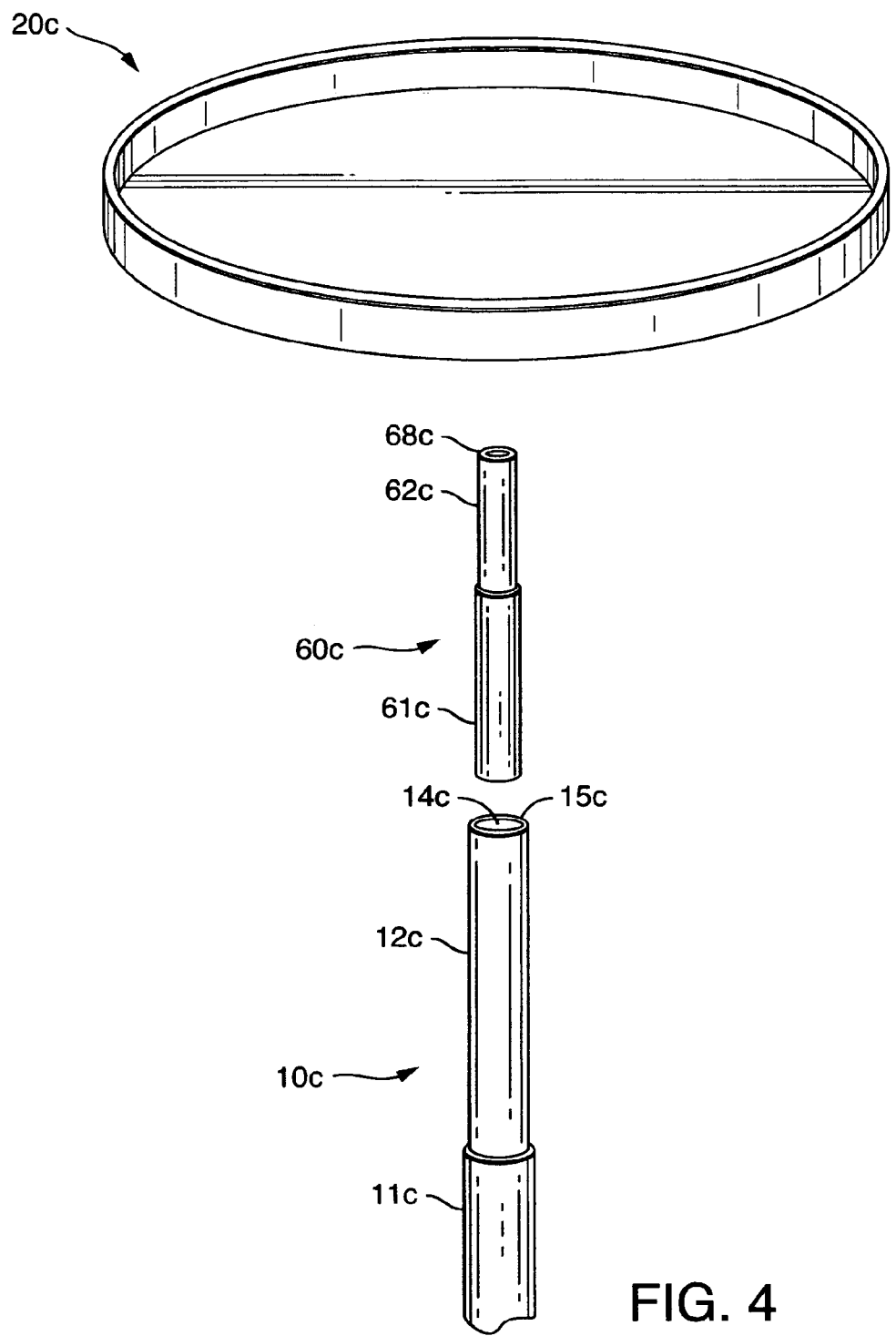
FIG. 4 is an exploded, schematic, isometric, view showing the upper portion of yet another embodiment of the invention comprising means whereby the cart, while secured at its preselected length, may be temporarily manually shortened by the operator without disturbing the setting of its preselected length.

It is highly desirable that the cart of the invention include means to provide sufficient vertical elasticity thereto such that, without disturbance of its preselected length, the overall cart length may be temporarily shortened by a few inches simply by manually biasing it downwardly. In this manually induced temporary shortened condition the cart may then be moved under a table for convenient storage. This capability may be achieved by judicious selection of design parameters and/or material of construction of the castered base 1 and/or support member 10. For example, in the embodiment of the invention of FIG. 1 the base legs 2 may be conformed as downwardly arcuate leaf springs and the material of construction thereof may be in the nature of an elastic polymeric composition such as glass fiber filled nylon or a metal such as spring steel or aluminum alloy. Referring now to FIG. 4, there is shown an alternative scheme whereby said means to provide vertical elasticity takes the form of a gas spring 60c comprising a gas chamber 61c and piston 62c. The gas chamber 61c is completely housed in the bore 14c of uppermost tube element 12c with the free end 68c of piston 62c extending several inches beyond the upper end 15c of said uppermost tube element. Principal service tray 20c is affixed to the free end 68c of the piston 62c. In use, the operator simply manually depresses the principal service tray 20c, thereby forcing the extended piston 62c of gas spring 60c to retract into the gas chamber 61c and temporarily shortening the overall length of the cart. Upon release of the manual pressure exerted by the operator, the operation of the gas spring 60c returns the piston 62c to its extended position, thereby returning the cart to its preselected overall length without the necessity for readjustment of the extensible tubular support member 10c.

Figure 2:
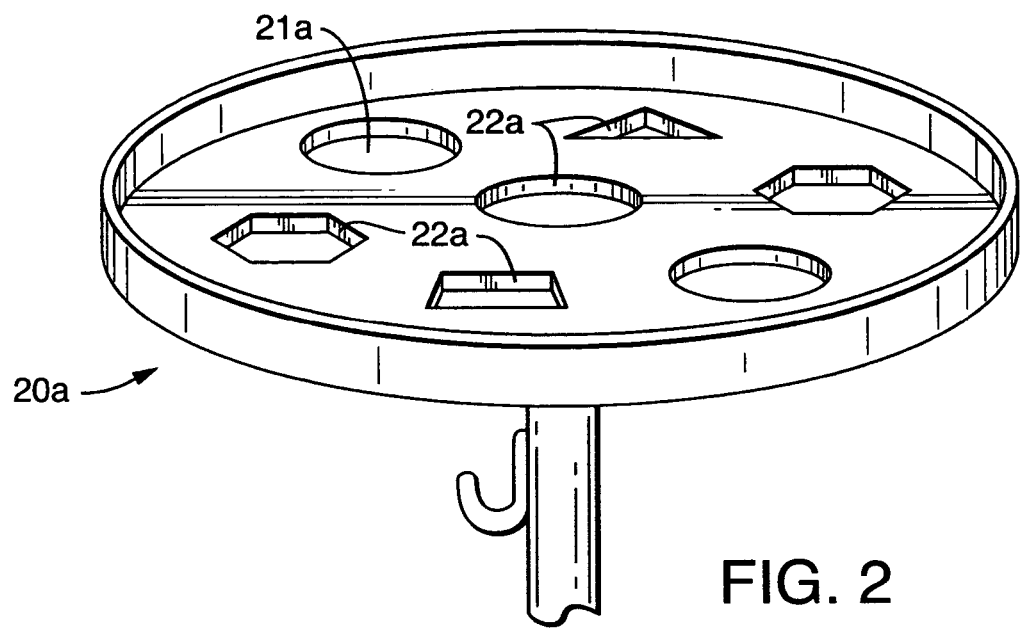
FIG. 2 is a schematic isometric view showing the upper portion of another embodiment of the invention comprising a preferred form of principal service tray element.
Figure 3:
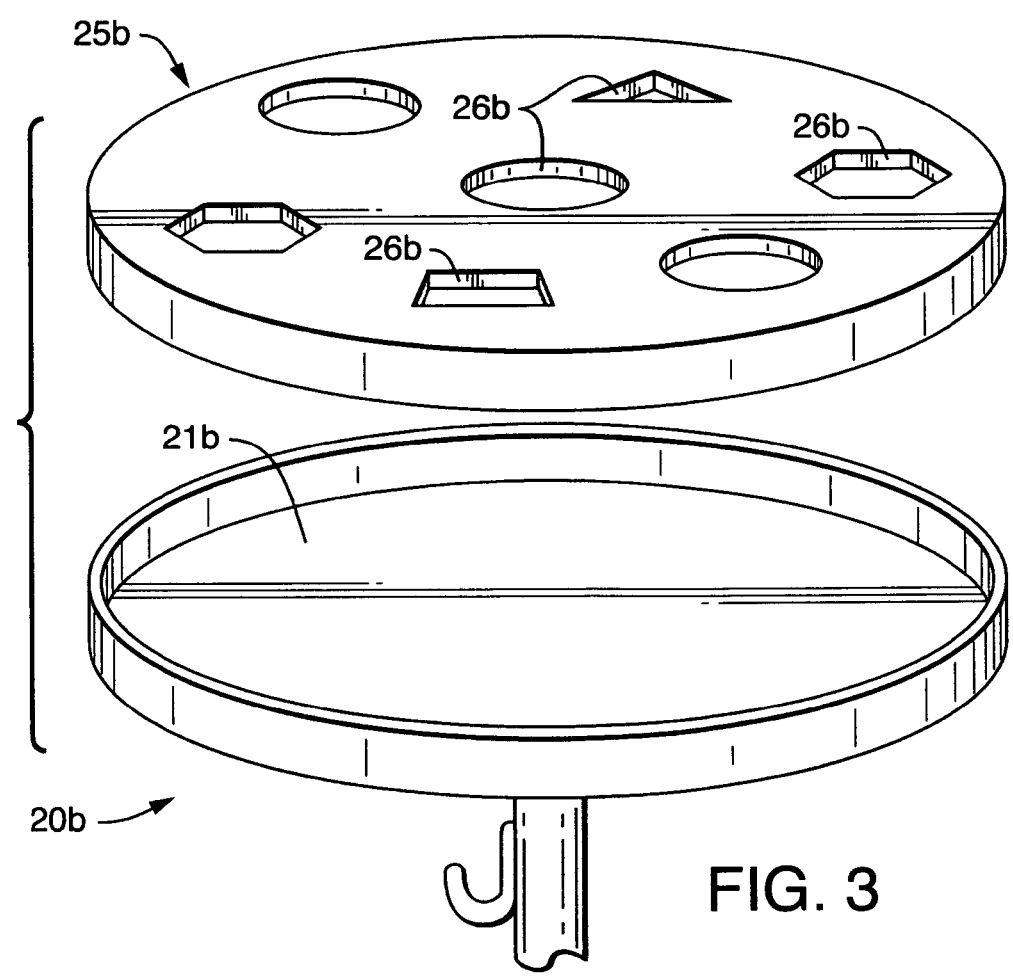
FIG. 3 is an exploded, schematic, isometric view showing the upper portion of another embodiment of the invention comprising an alternative preferred form of principal service tray element.

Again referring to FIG. 1, I much prefer that the principal service tray 20 be provided with at least one and, of even greater preference, a plurality of recesses of sizes and shapes to closely receive the containers for the goods used in service and to thereby prevent them from sliding and slipping over the surface of the tray during use or movement of the cart. One manner of providing such recesses is shown in FIG. 2 wherein said recesses are defined by one or more suitably sized and shaped depressions 22a formed in the floor 21a of principal service tray 20a. The depth of said depressions 22a required for any particular service will, in general, be obvious to those of skill in art and can vary from, say, about ¼ inch to about 3 inches. In the case of a principal service tray 20a formed of sheet metal, said depressions can be formed by deep drawing. In the case of a principal service tray 20a formed of a thermoplastic, such as ABS, the depressions can be formed by any of several molding techniques, such as injection molding, drape molding, vacuum forming and the like. An alternative scheme for providing such recesses is shown in FIG. 3. In this case, the principal service tray 20b is provided with lid 25b which, when assembled to the service tray, defines a space between the floor 21b of service tray 20b and the lid 25b. Said lid 25b is provided with one or more suitably sized and shaped apertures 26b, thereby to define the container-receiving recesses.

The service cart of the invention may also comprise additional elements which can contribute to its utility in service. Referring once again to FIG. 1, such additional elements are generally affixed to or suspended from the uppermost tube element 12 of the vertical support member 10. For example, as shown, an auxiliary or secondary service tray or shelf 30, spaced below the principal tray 20, can be affixed to the uppermost tube element 12. Preferably, this attachment will be of detachable or pivotal nature. Too, I prefer that the auxiliary tray or shelf 30 be of rectangular geometry and, further, that it be of a length sufficient to project substantially beyond the rim of the principal service tray 20. Yet another helpful additional element of the invention affixed to or suspended from the uppermost tube element 12 is a detachable container, pail or bucket 50 which, alternatively, provides either a convenient waste disposal site for such waste as may be generated during the course of a service session or a storage receptacle for transiently used equipment, such as a goniometer, sphygmomanometer, stethoscope or the like. Additionally, the uppermost tube element 12 may also have affixed thereto a towel hook 40.

Although the invention has been described and illustrated above with respect to certain specific embodiments thereof it should be recognized and understood that various alterations and modifications in the details of construction may be made without departing from the essential spirit and scope of the invention as indicated by the appended claims.

What is claimed is:

1. A medi-spa service cart comprising: a castered base having affixed thereto a selectively extensible vertical support member comprising at least two telescoping tube elements and including a lowermost and an uppermost tube element and, affixed to the upper end of said uppermost tube element, a latch attached to the lowermost tube element to lock the uppermost tube element to the lowermost tube element, a detachable principal service tray of circular geometry, means to provide sufficient vertical elasticity thereto such that the overall cart length may be temporarily manually shortened by at least several inches without disturbance of its preselected length, a detachable and pivotally connected auxiliary service tray of rectangular geometry attached to the uppermost tube element, said auxiliary service tray having a length sufficient to project substantially beyond a rim of the principal service tray; a detachable bucket affixed to the uppermost tube element on a side opposite from the auxiliary service tray; a hook affixed to the uppermost tube element at a position below the principal service tray and above said auxiliary service tray and said bucket; wherein said means comprises a castered base comprising a central hub having five radially and equiangularly spaced legs extending therefrom, each said leg being conformed as a downwardly arcuate leaf spring, a caster depending from the outer end of each said leg, and said lowermost tube member of said extensible vertical support member being affixed to said hub, and at least one caster including a releasable brake; said principal service tray comprising: a collar on a bottom of the tray dimensioned to define a snugly fitting socket to receive the uppermost tube element;

a principal service tray floor; a principal service tray lid spaced above the floor thereof and including a plurality of suitably sized and shaped apertures through said lid.

2. A medi-spa service cart comprising: a castered base having affixed thereto a selectively extensible vertical support member comprising at least two telescoping tube elements and including a lowermost and an uppermost tube element and, affixed to the upper end of said uppermost tube element, a latch attached to the lowermost tube element to lock the uppermost tube element to the lowermost tube element, a detachable principal service tray of circular geometry, means to provide sufficient vertical elasticity thereto such that the overall cart length may be temporarily manually shortened by at least several inches without disturbance of its preselected length, a detachable and pivotally connected auxiliary service tray of rectangular geometry attached to the uppermost tube element, said auxiliary service tray having a length sufficient to project substantially beyond a rim of the principal service tray; a detachable bucket affixed to the uppermost tube element on a side opposite from the auxiliary service tray; a hook affixed to the uppermost tube element at a position below the principal service tray and above said auxiliary service tray and said bucket; wherein said means comprises a castered base comprising a central hub having five radially and equi-angularly spaced legs extending therefrom, each said leg being conformed as a downwardly arcuate leaf spring, a caster depending from the outer end of each said leg, and said lowermost tube member of said extensible vertical support member being affixed to said hub, and at least one caster including a releasable brake; said principal service tray comprising: a collar on a bottom of the tray dimensioned to define a snugly fitting socket to receive the upper end of the piston; a principal service tray floor including a plurality of recesses defined by depressions of various sizes and shapes to receive and retain a container for the goods used in service.

3. A medi-spa service cart comprising: a castered base having affixed thereto a selectively extensible vertical support member comprising at least two telescoping tube elements and including a lowermost and an uppermost tube element and, affixed to the upper end of said uppermost tube element, a latch attached to the lowermost tube element to lock the uppermost tube element to the lowermost tube element, a detachable principal service tray of circular geometry, means to provide sufficient vertical elasticity thereto such that the overall cart length may be temporarily manually shortened by at least several inches without disturbance of its preselected length, a detachable and pivotally connected auxiliary service tray of rectangular geometry attached to the uppermost tube element, said auxiliary service tray having a length sufficient to project substantially beyond a rim of the principal service tray; a detachable bucket affixed to the uppermost tube element on a side opposite from the auxiliary service tray; a hook affixed to the uppermost tube element at a position below the principal service tray and above said auxiliary service tray and said bucket; wherein said means comprises a castered base comprising a central hub having five radially and equi-angularly spaced legs extending therefrom, each said leg being conformed as a downwardly arcuate leaf spring, a caster depending from the outer end of each said leg, and said lowermost tube member of said extensible vertical support member being affixed to said hub, and at least one caster including a releasable brake; said means comprises said uppermost tube element comprising a bore housing therein a gas spring having a piston extending at least several inches beyond a free end of said uppermost tube element and said principal service tray is affixed to said piston; said principal service tray comprising: a collar on a bottom of the tray dimensioned to define a snugly fitting socket to receive the upper end of the piston; a principal service tray floor, a principal service tray lid spaced above the floor thereof and including a plurality of suitably sized and shaped apertures through said lid.

* * * * *